United States Patent [19]

Musschoot

[11] Patent Number: 5,178,259
[45] Date of Patent: Jan. 12, 1993

[54] VIBRATORY CONVEYING APPARATUS

[75] Inventor: Albert Musschoot, Barrington, Ill.

[73] Assignee: General Kinematics, Barrington, Ill.

[21] Appl. No.: 693,570

[22] Filed: Apr. 30, 1991

[51] Int. Cl.$^5$ .............................................. B65G 27/32
[52] U.S. Cl. ..................................... 198/753; 198/770
[58] Field of Search ................................ 198/753, 770

[56] References Cited

U.S. PATENT DOCUMENTS

| | | | |
|---|---|---|---|
| 3,068,996 | 12/1962 | Musschoot | 198/753 |
| 3,712,459 | 1/1973 | Musschoot et al. | 198/753 |
| 3,746,149 | 7/1973 | Schrader | 198/753 |
| 4,152,255 | 5/1979 | Musschoot | 198/753 |
| 4,241,769 | 12/1980 | Wiesner | 198/753 |
| 4,495,826 | 1/1985 | Musschoot | 198/770 |
| 4,617,832 | 10/1986 | Musschoot | 198/770 |

FOREIGN PATENT DOCUMENTS 847940 9/1960 United Kingdom ................ 198/770

*Primary Examiner*—Joseph E. Valenza
*Attorney, Agent, or Firm*—Wood, Phillips, VanSanten, Hoffman & Ertel

[57] ABSTRACT

A vibratory conveying apparatus including a material carrying member having a material supporting surface is disclosed. The apparatus includes first and second vibrators for producing first and second vibratory forces for imparting movement to the material carrying member at first and second acute angles to the material supporting surface. The vibratory forces of the first and second vibrators each have a vertical force component as well as a horizontal force component for imparting movement to a material on the material supporting surface in the first and second directions relative to the material supporting surface. The apparatus also includes an actuator for controlling the first and second vibrators in such manner as to impart controlled movement to the material relative to the material supporting surface in the first direction, the second direction, or vertically. In a preferred embodiment, the vibratory conveying apparatus is able to vary the angle of attack and direction of the material relative to the material supporting surface.

22 Claims, 5 Drawing Sheets

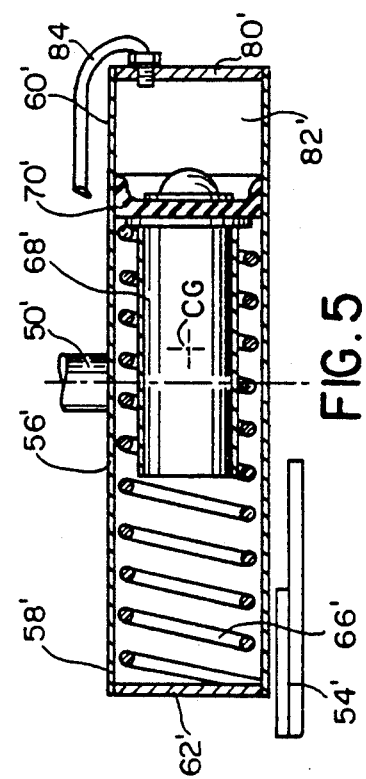
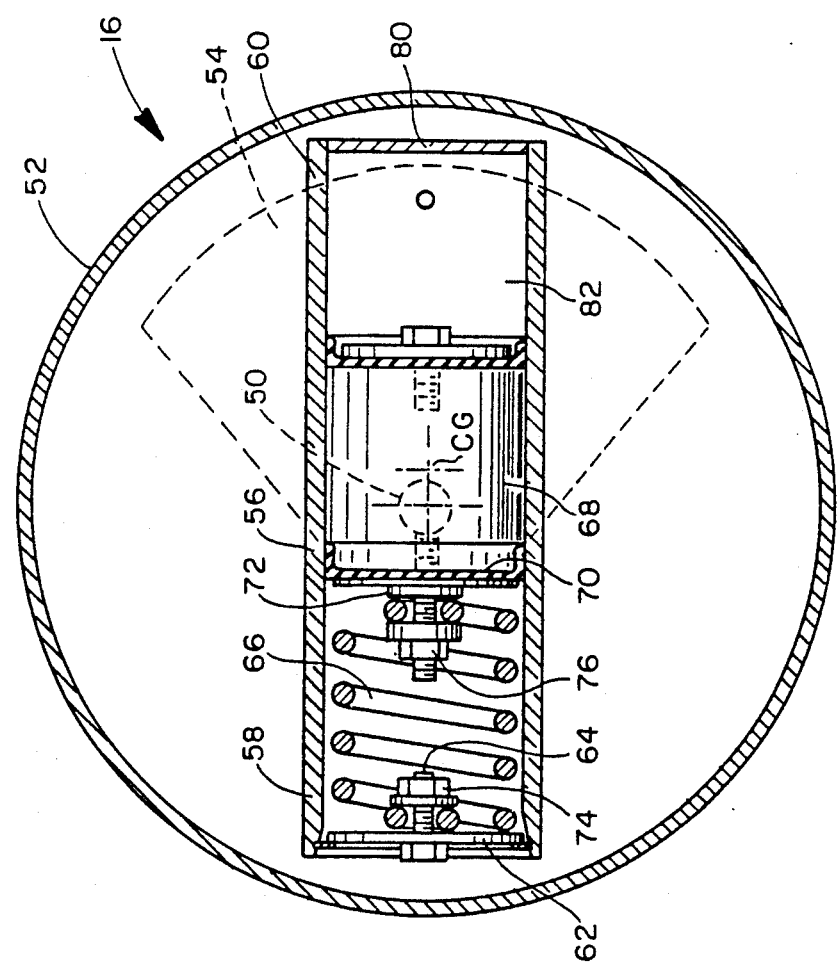

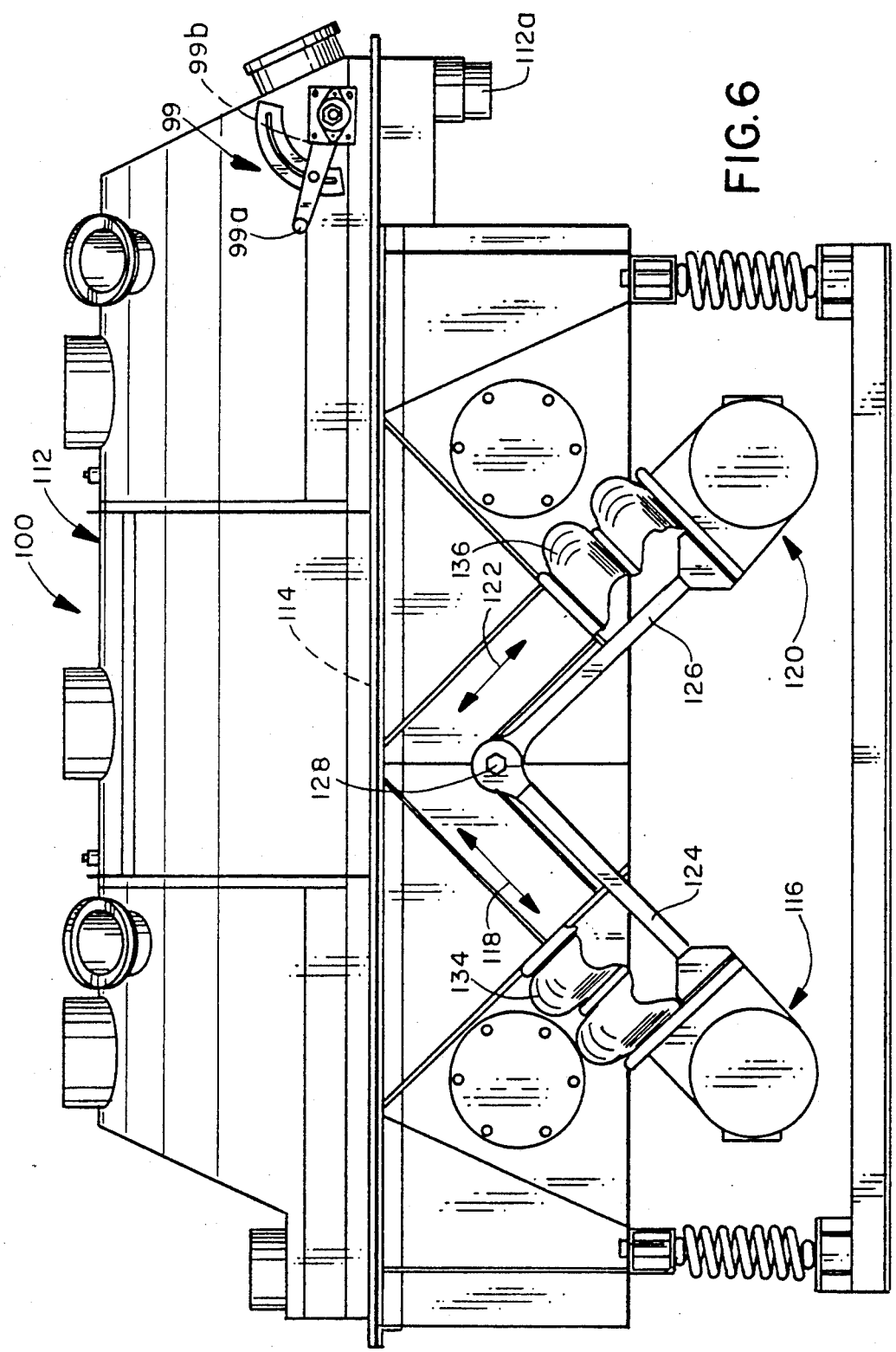

VIBRATORY CONVEYING APPARATUS

FIELD OF THE INVENTION

The present invention generally relates to vibratory devices and, more particularly, to a vibratory conveying apparatus having a material carrying member.

BACKGROUND OF THE INVENTION

In conventional vibratory conveyors, a material carrying member is vibrated in such manner as to cause material movement on a material supporting surface thereof. The known devices may be selectively operated to provide movement in different directions, such as in opposite directions, by appropriately controlling the vibrating means. However, generally speaking, it has been recognized that the known devices have been less than entirely satisfactory for their intended purpose in several important respects.

In particular, the known devices have generally been deficient in terms of their flexibility for a variety of different applications. It is important in this connection to recognize that it is highly desirable for any given vibratory conveying apparatus to be sufficiently versatile to accomplish a multitude of tasks. To this end, commonly owned U.S. Pat. No. 3,712,459 disclosed a unique vibratory conveyor which represented a significant technical advancement.

As disclosed therein, a vibratory conveyor having a high degree of versatility has been successfully achieved. The vibratory conveyor of the '459 patent is particularly well suited for handling hot objects such as castings whereby the conveyor can be operated to initially throw the castings so as to effect cooling and it can thereafter deliver the cooled castings in a desired one of different directions of conveying which are available in utilization of the apparatus in order to deliver the cooled castings to a desired delivery point. While a significant advancement, it has remained to further advance the art in several important respects.

In particular, it is recognized that reductions in cost and complexity are always issues of significance. It is still further recognized that it is important to be able to selectively actuate a minimum number of vibrators and to be able to vary the magnitude of vibratory forces so as to vary both the angle of attack and direction of material relative to a material supporting surface. Still additionally, it is recognized to be important to eliminate random vibrations.

The present invention is directed to overcoming one or more of the foregoing problems and achieving one or more of the resulting objects.

SUMMARY OF THE INVENTION

It is therefore a principal object of the present invention to provide an improved vibratory conveying apparatus. It is a further object of the present invention to provide a vibratory conveying apparatus which is relatively low in cost and complexity, minimizes the number of component parts, and makes it possible to vary the angle of attack and direction of a material relative to a material supporting surface. It is still an additional object of the present invention to provide stabilization for eliminating random vibrations.

Accordingly, the present invention is directed to a vibratory apparatus including a material carrying member having a material supporting surface. The apparatus includes means for supporting the material carrying member for vibratory movement together with means for vibrating the material carrying member in order to impart movement to a material on the material supporting surface. The vibrating means includes a first vibrator for producing a first vibratory force for imparting movement to the material carrying member at a first acute angle to the material supporting surface. The vibratory force of the first vibrator has a vertical force component and a horizontal force component for imparting movement to the material in a first direction relative to the material supporting surface. The vibrating means also includes a second vibrator for producing a second vibratory force for imparting movement to the material carrying member at a second acute angle to the material supporting surface. The vibratory force of the second vibrator has a vertical force component and a horizontal force component for imparting movement to the material in a second direction relative to the material supporting surface. The apparatus also includes means for actuating the first and second vibrators in such manner as to impart controlled movement to the material relative to the material supporting surface in the first direction, the second direction or vertically. In addition, the apparatus may include means for stabilizing the first and second vibrators in order to eliminate any random vibrations therefrom.

In a preferred embodiment, the material supporting surface is a generally elongated surface with a longitudinally extending axis. Thus, the first direction for imparting movement is axially directly opposite the second direction for imparting movement. In addition, the apparatus preferably includes a link extending from each of the first and second vibrators to a pivotal connection remote therefrom.

In a highly preferred embodiment, the links are rigidly secured to and extend from each of the first and second vibrators. The links serve to eliminate random vibrations with the first vibrator, pivotal connection and second vibrator being at the apices of a triangle in which the first and second vibrators are located in a generally horizontal plane. With this arrangement, the pivotal connection, which is preferably a flexible connection, may be located below or above the horizontal plane.

In one embodiment, the links extend from the first and second vibrators generally in the direction of the first and second vibratory forces. In another embodiment, the links extend from the first and second vibrators generally transverse to the first and second vibratory forces.

In a most highly preferred embodiment, the apparatus includes means for selectively actuating the first and second vibrators in such manner as to selectively impart the first and second vibratory forces to the material supporting surface of the material carrying member for controlling movement of material thereon. Also, in the most highly preferred embodiment, the apparatus includes means for varying the magnitude of the vibratory forces produced by the first and second vibrators to vary the angle of attack and direction of the material relative to the longitudinally extending axis of the material supporting surface.

Other objects, advantages and features of the present invention will become apparent from a consideration of the following specification taken in conjunction with the accompanying drawings.

BRIEF DESCRIPTION OF THE DRAWINGS

FIG. 4 is a sectional view of a vibrator for use with the vibratory conveying apparatus of the present invention;

FIG. 5 is a sectional view of a alternative embodiment of vibrator for use with the vibratory conveying apparatus of the present invention;

FIG. 6 is a fragmentary side elevational view of a first alternative embodiment of vibratory conveying apparatus in accordance with the present invention.

DETAILED DESCRIPTION OF THE PREFERRED EMBODIMENT

Figure 1:
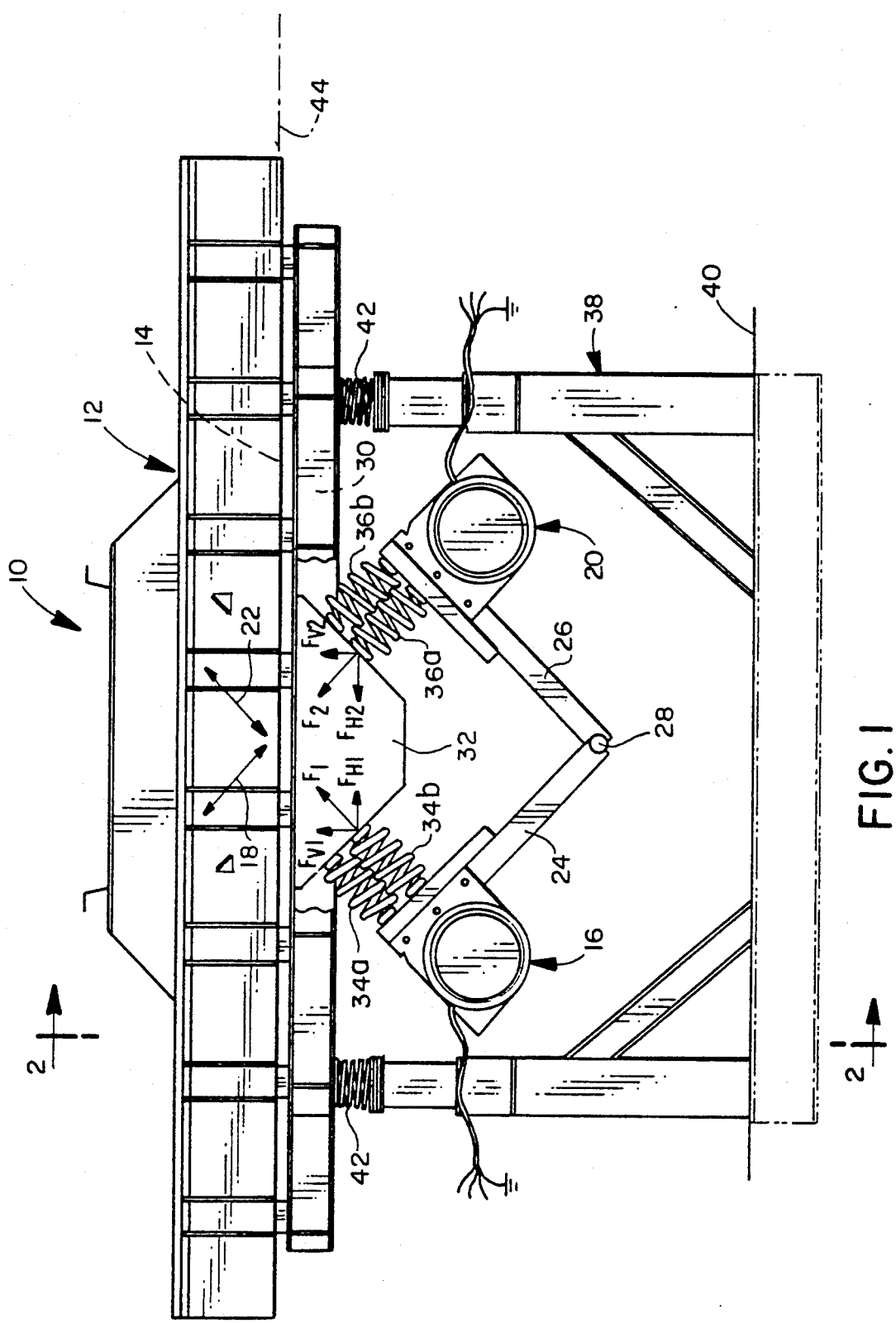
FIG. 1 is a fragmentary side elevational view of the vibratory conveying apparatus in accordance with the present invention.
Figure 2:
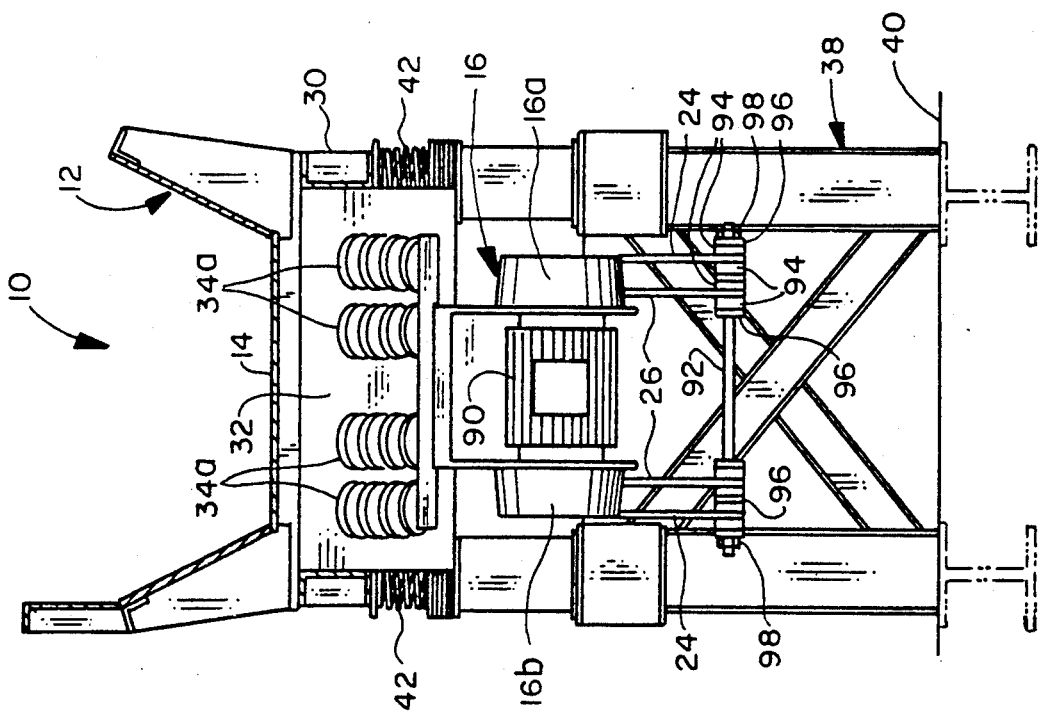
FIG. 2 is a vertical sectional view of the vibratory conveying apparatus taken substantially along the line 2—2 of FIG. 1.

Referring to the drawings, and first to FIG. 1, the reference numeral 10 designates generally a vibratory conveying apparatus including a material carrying member 12 having a material supporting surface 14. The apparatus 10 includes means for supporting the material carrying member 12 for vibratory movement together with means for vibrating the material carrying member 12 to impart movement to a material on the material supporting surface 14. The vibrating means comprises a first vibrator means or system generally designated 16 for producing a first vibratory force $F_1$ generally along the line 18 for imparting movement to the material carrying member 12 at a first acute angle to the material supporting surface 14. It will be appreciated that the vibratory force $F_1$ represented by the line 18 has a vertical force component $F_{V1}$ as well as a horizontal force component $F_{H1}$ for imparting movement to the material in a first direction, i.e., horizontally to the right, relative to the material supporting surface 14 as shown in FIG. 1. The vibrating means also includes a second vibrator means or system 20 for producing a second vibratory force $F_2$ generally along the line 2 for imparting movement to the material carrying member 12 at a second acute angle to the material supporting surface 14. It will be appreciated that the second vibratory force $F_2$ will also have a vertical force component $F_{V2}$ as well as a horizontal force component $F_{H2}$ for imparting movement to the material in a second direction, i.e., horizontally to the left, relative to the material supporting surface 14 as shown in FIG. 2. The apparatus 10 further includes means for actuating the first and second vibrator means or systems 16 and 20 in such manner as to impart controlled movement to the material relative to the material supporting surface 14 in the first direction, the second direction, or vertically. For this purpose, the apparatus 10 preferably includes means for varying the magnitude of the vibratory forces $F_1$ and $F_2$ produced by the first and second vibrator means or systems 16 and 20.

Still referring to FIG. 1, the apparatus 10 includes links 24 and 26 for joining the first and second vibrators 16 and 20 in a manner eliminating random vibrations therefrom. It will be seen that the links 24 and 26 are rigidly secured to and extend from the respective first and second vibrators 16 and 20. As shown, the links 24 and 26 each extend to a flexible pivotal connection 28 located at a point remote from the respective first and second vibrators 16 and 20.

Still referring to FIG. 1, it will be appreciated that the first vibrator 16, pivotal connection 28 and second vibrator 20 are located at the apices of a triangle. The first and second vibrators 16 and 20 will also be seen to be located in a generally horizontal plane which is substantially parallel to the plane of the material supporting surface 14. In the embodiment illustrated in FIG. 1, the flexible pivotal connection 28 is positioned below the horizontal plane in which the first and second vibrators 16 and 20 are located.

Also as shown in FIG. 1, the links 24 and 26 each extend in a direction generally transverse to the first and second vibratory forces $F_1$ and $F_2$, respectively. The rigid securement of the links 24 and 26 to the respective first and second vibrators 16 and 20, along with the flexible pivotal connection 28, serve well to confine the respective vibratory forces rather closely to the directions represented by the double arrow lines 18 and 22 while eliminating any random vibrations. As a result, the apparatus 10 may be operated in a precise manner to selectively impart a controlled movement to a material as will be described in detail hereinafter.

In this connection, the apparatus 10 preferably includes a base portion 30 which carries on its underside a depending vibratory mount 32. It will be seen that each of the first and second vibrator systems 16 and 20 are secured to the vibrator mount 32 by means of springs 34a, 34b and 36a, 36b, respectively. When the first and second vibrator systems 16 and 20 are actuated, they transmit the forces $F_1$ and $F_2$ to the base portion 30 through the springs 34a, 34b and 36a, 36b.

Still referring to FIG. 1, the apparatus 10 may suitably include a supporting frame generally designated 38 that may be anchored in a concrete floor 40. It was previously mentioned that the apparatus 10 included means for supporting the material carrying member 12 for vibratory movement, and this is accomplished through suitable resilient mounting means 42 interposed between the frame 38 and the base 30 substantially as illustrated. Of course, the material carrying member 12 may be secured to the base 30 in any conventional manner as will be appreciated.

In the embodiment illustrated in FIG. 1, the vibratory conveying apparatus 10 is provided with an elongated material supporting surface 14 having a longitudinally extending axis 44. It will, thus, be appreciated that the respective horizontal force components $F_{H1}$ and $F_{H2}$ may serve to either impart controlled movement of a material from left to right, or right to left, or they may simply cancel out allowing pure vertical movement by reason of the vertical force components $F_{V1}$ and $F_{V2}$, depending upon the magnitude of these respective force components. To this end, the vibratory conveying apparatus 10 suitably includes means for varying the magnitude of the vibratory forces $F_1$ and $F_2$ produced by the first and second vibrators 16 and 20.

As will also be appreciated, this feature permits not only the direction but also the angle of pitch or attack of the material to be varied. Thus, assuming $F_{H1}$ to be at a maximum and $F_{H2}$ to be at zero, the angle of attack may, by way of example, be approximately 45° as will be appreciated from the illustrated force diagram whereby the acute angle for movement imparted by the vibratory force $F_1$ from the first vibrator 16 is likewise 45°. Of course, if only the second vibrator 20 is actuated, the angle of attack of the material will be 45° in the axially opposite direction.

As will now be appreciated, the first direction for imparting material movement is axially directly opposite the second direction therefor. Thus, the acute angles for movement imparted by the vibratory forces 18 and 22 are, respectively, approximately 45° in axially opposite directions relative to the material supporting surface 14 whenever forces are being imparted by only one of the first and second vibrators 16 and 20. However, by varying the magnitude of the vibratory forces 18 and 22, the acute angle for movement may be changed to an angle other than 45°.

Referring to FIG. 4, the details of one possible arrangement for the first and second vibrators 16 and 20 can be better understood. Each of the vibrators 16 and 20 (the vibrator 16 being illustrated for purposes of discussion) has a motor shaft 50 which carries duplicate wheel-like members 52, one of which is shown. As also shown, a fixed weight 54 is fixed on each of the wheel-like members 52 on one side of the axis of rotation of the motor shaft 50.

In addition, a cylinder or carrier 56 which extends radially on either side of the motor shaft 50 has a longitudinal axis that lies in a plane that passes through the center of gravity of the fixed weight 54 and through the axis of rotation of the motor shaft 50. The cylinder or carrier 56 has one end portion 58 on one side of the center of gravity (CG) of the fixed weight 54 and has an opposite end portion 60 on the diametrically opposite side of the axis of rotation of the motor shaft 50. Additionally, it will be appreciated that a cap 62 is provided to close the end 58 of the cylinder 56, and the cap 62 has a bumper or stop member 64 which extends through the midportion thereof into the inside of the end portion 58 of the cylinder 56.

Still referring to FIG. 4, a coil spring 66 is secured to the end cap 62 and is positioned in the end portion 58 of the cylinder 56. A weight 68 is secured to a piston 70 which is slidably mounted in the cylinder 56 and a second threaded stop member 72 extends from the midportion of the one end of the piston 70 toward the stop 64 such that the ends of the spring 66 may be suitably secured to the stop members 64 and 72 or to the end cap 62 and to one end of the piston 70. As also shown in FIG. 4, adjusting nuts 74 and 76 are threaded on the respective stop members 64 and 72 so as to adjust the positions of the stop members relative to each other.

As shown in FIG. 4, in the at rest or stationary position of the wheel-like member 52 the center of gravity (CG) of the weight 68 is offset to the right of the axis of rotation of the wheel-like member 52. Stated another way, the center of gravity (CG) of the movable weight 68 is displaced outboard of the center of rotation of the wheel-like member 52 on the side of the center of rotation opposite to the spring 66 with the spring in its neutral, uncompressed, untensioned condition. Further, the center of gravity (CG) of the movable weight 68 is displaced outboard of the axis of rotation of the wheel-like member 52 so that centrifugal forces will act on the movable weight 68 upon rotation thereof.

As will be appreciated, a cap 80 closes the end 60 of the cylinder 56 to form therein a pressure chamber 82 which is defined by the space between one end of the piston 70 and the cap 80. A fluid pressure line (not shown) connects at one end to the pressure chamber 82 and at its other end to a rotatable connector (also not shown) which is mounted on the motor shaft 50. Additionally, a fluid pressure line (also not shown) connects at one end to the rotatable connector and at its other end to a source of fluid under pressure, i.e., air, hydraulic or pneumatic fluid.

As for the operation and other details of construction of the vibrator illustrated in FIG. 4, the teachings of my commonly owned U.S. Pat. No. 4,495,826, issued Jan. 29, 1985, are hereby incorporated by reference.

Referring to FIG. 5, it will be appreciated that a slightly different wheel-like member has been illustrated. It will be seen to have a motor shaft 50' and fixed on each wheel-like member (such as 52 in FIG. 4) on one side of the axis of rotation of the shaft 50' is a fixed weight 54'. Also, mounted on each wheel-like member is a cylinder 56' which extends radially on either side of the shaft 50'.

Still referring to FIG. 5, the cylinder 56' has one end 58' near the center of gravity (CG) of the weight 54' and the opposite end 60' on the other side of the axis of rotation of the shaft 50'. A cap 62' closes the end 58' of the cylinder 56' and secured thereto is a coil spring 66'. Within the cylinder 56' is a weight 68' secured to a piston 70' slidable in the cylinder 56' with the piston 70' and weight 68' together forming a movable weight within the cylinder 56'.

As shown in FIG. 5, a cap 80' closes the end 60' of the cylinder 56' to form therein a pressure chamber 82' between the piston 70' and the cap 80'. A fluid pressure line 84 connects at one end to the pressure chamber 82' and at its other end to a rotatable connector (not shown) mounted on the shaft 50'. As before, a fluid pressure line (also not shown) connects at one end to the rotatable connector and at its other end to a source of fluid under pressure.

Once again, as for operation and further details of construction of the vibrator illustrated in FIG. 5, the teachings of my commonly owned U.S. Pat. No. 4,495,826, issued Jan. 29, 1985, are hereby incorporated by reference.

Figure 3:
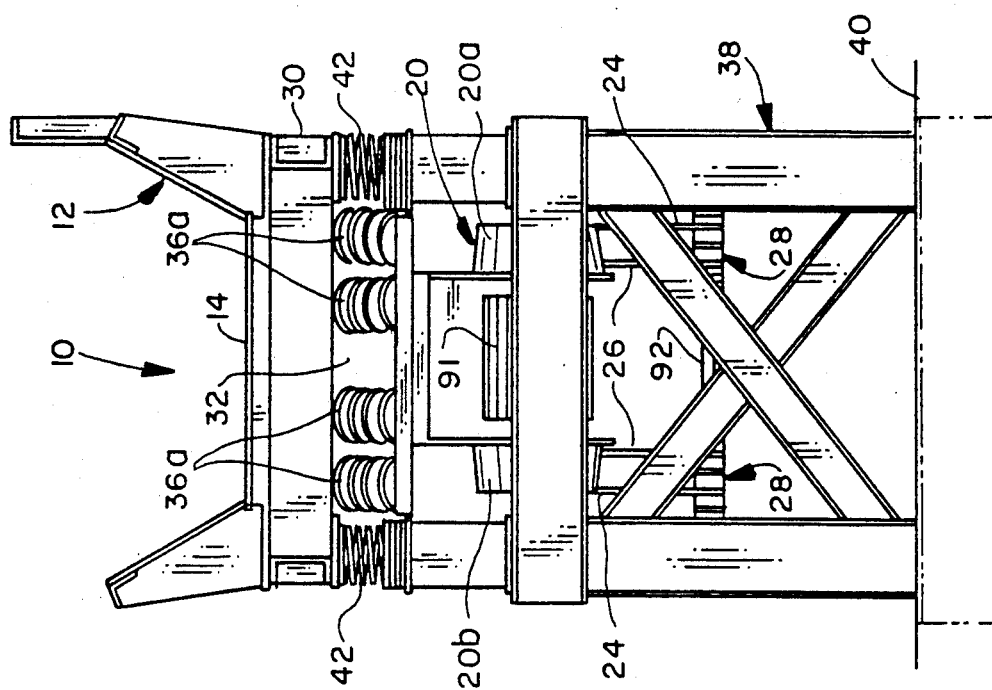
FIG. 3 is a fragmentary end elevational view of the vibratory conveying apparatus in accordance with the present invention.

As will be appreciated by referring to FIGS. 2 and 3, the vibrator means or systems 16 and 20 preferably each include a pair of vibrator units 16a, 16b and 20a, 20b, respectively. It will be seen that these units 16a, 16b and 20a, 20b are preferably spaced apart whereby a motor such as 90 and 91, respectively, may be provided to drive each of the vibrator means or systems 16 and 20. As will also be appreciated, a source of fluid under pressure (air, hydraulic, or pneumatic fluid) will be connected to each of the units 16a, 16b and 20a, 20b as previously described.

When it is desired to use the vibratory conveying apparatus 10, both of the motors 90 and 91 will be activated to impart rotational movement to the various wheel-like members 52 of the vibrator units 16a, 16b and 20a, 20b. It will then be possible by utilizing one or more conventional fluid pressure control devices to selectively impart the first and second vibratory forces $F_1$ and $F_2$ to the material supporting surface 14 of the material carrying member 12 and to vary the magnitude of the vibratory forces $F_1$ and $F_2$ produced by the first and second vibrators 16 and 20 between zero and a maximum for the purpose of varying the angle of pitch or attack of the material as well as the direction of movement of the material on the material supporting surface 14 in relation to the longitudinally extending axis 44 thereof. By utilizing the principles disclosed in my commonly owned U.S. Pat. No. 4,495,826, issued Jan. 29, 1985, the material may thereby undergo controlled movement in the first direction, the second direction, or vertically.

By way of example, the vibrators 16 and 20 may be set such that at zero pressure the first vibrator 16 will be at maximum force and the second vibrator 20 will be at zero force whereby material on the material supporting surface 14 will have an angle of attack of approximately 45° and will undergo movement to the right in FIG. 1. It will also then be the case that if the pressure control device supplies fifty percent of its maximum pressure, e.g., 40 psi, the first and second vibrators will both be at fifty percent of their maximum force wherein the horizontal force components $F_{H1}$ and $F_{H2}$ will cancel to thereby subject material on the material supporting surface 14 to purely vertical movement. Additionally, the first and second vibrators 16 and 20 can be set such that at one hundred percent pressure the first vibrator 16 will be at zero force and the second vibrator 20 will be at maximum force whereby material on the material supporting surface 14 will have an angle of attack of approximately 45° and will move to the left in FIG. 1.

As will be appreciated, the pressure control device will be such that the pressure is universally variable between zero and maximum pressure to vary the angle of attack and direction of the material from 45° to the right, through vertical, to 45° to the left as shown in FIG. 1.

Referring now to FIG. 6, a somewhat different vibratory conveying apparatus 100 has been illustrated. It will be seen, nevertheless, to have many aspects in common with the vibratory conveying apparatus 10 which has been described in detail hereinabove and, therefore, such common aspects will no be described in significant detail herein. For purposes of brevity, the principal discussion will center on the differences of this embodiment over FIG. 1.

As shown in FIG. 6, the vibratory conveying apparatus 100 has a vibrator mount 132 to which the vibrators 116 and 120 are secured so as to be located in a generally horizontal plane. It will be noted, however, in contrast to FIG. 1 that while the links 124 and 126 are again rigidly secured to the respective vibrators 116 and 120, they extend to a flexible pivotal connection 128 at a point located above the horizontal plane in which the first and second vibrators 116 and 120 are located. In this connection, the extension of the links 124 and 126 upward is well suited for applications where there is limited vertical space below the necessary location for the first and second vibrators 116 and 120.

As for the flexible pivotal link 128, it can be similar or identical to the flexible pivotal connection 28. It will be appreciated, of course, by referring in particular to FIG. 2 that the flexible pivotal connection 28 actually comprises one such connection for each of the vibrator units such as 16a, 16b with the two being interconnected by means of a shaft 92. Still referring to FIG. 2, the flexible pivotal connections 28 can be understood in greater detail.

In particular, the shaft 92 will be seen to extend through the links 24 and 26. It will also be seen from FIG. 2 that there are alternating rubber, synthetic rubber or other resilient material bushings 94 and metal compression discs 96 wherein the innermost ones of the metal compression discs 96 are fixed to the shaft 92 such that nuts 98 may be applied to suitable threads provided on the ends of the shaft 92 and such nuts 98 can be drawn to a desired degree of tightness to control the flexibility of the respective pivotal connections 28. Clearly, it will be appreciated that the flexible pivotal connections 128 can be identically constructed.

With the arrangement illustrated in FIG. 6, the links 124 and 126 will be seen to extend from the first and second vibrators 116 and 120 generally in the direction of the first and second vibratory forces $F_1$ and $F_2$. It will also be noted that, rather than utilizing coil springs such as 34a, 34b and 36a, 36b, the embodiment illustrated in FIG. 6 utilizes air springs 134 and 136 such as those sold under the trademarks Airstroke and Airmount by Firestone Industrial Products Company, Noblesville, Ind. By substituting the air springs 134 and 136 for coil springs such as 34a, 34b and 36a, 36b, the vibratory conveying apparatus 100 illustrated in FIG. 6 can be subject to further "fine tuning."

More specifically, it will be appreciated that the air springs 134 and 136 are such that the spring force can be varied by varying the fluid pressure therein. This, in conjunction with the operation of the first and second vibrators 116 and 120, makes it possible to still further vary the magnitude of the vibratory forces $F_1$ and $F_2$ to vary the angle of attack and direction of the material relative to the longitudinally extending axis of the material supporting surface 114. As a result, the air springs 134 and 136 provide further flexibility in combination with the other components of a vibratory conveying apparatus such as 10 or 100.

Still referring to FIG. 6, the material supporting surface 114 in this particular embodiment comprises a fluidized bed which is advantageous for heating, cooling and/or drying a material. It may advantageously include a variable depth gate assembly generally designated 99 at one end of the material carrying member 112 for controlling the rate of flow of the material therefrom, i.e., the variable depth gate assembly may control the amount of material that flows through an outlet 112a at one end of the material carrying member 112. As shown, the variable depth gate assembly 99 suitably includes a control lever 99a for pivoting the top 99b of the gate 99 to a more or less elevated position relative to the material supporting surface 114.

Figure 7:
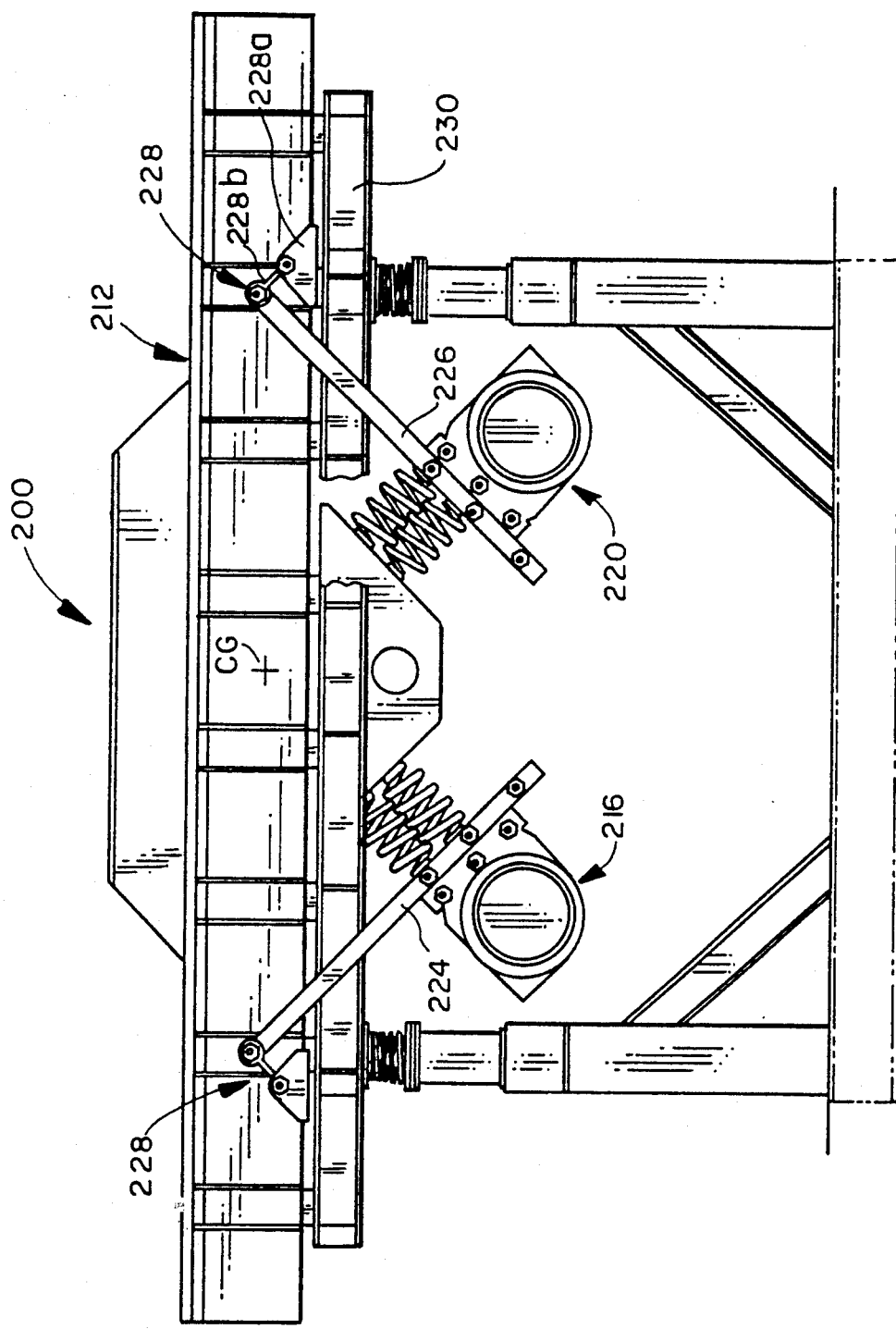
FIG. 7 is a fragmentary side elevational view of a second alternative embodiment of vibratory conveying apparatus in accordance with the present invention.

Finally, still another embodiment of vibratory conveying apparatus 200 is illustrated in FIG. 7 which is very closely similar to the embodiment illustrated in FIG. 1 with the exception of the links 224 and 226 which are again rigidly secured to the first and second vibrators 216 and 220. In this embodiment, however, the links 224 and 226 extend upwardly to entirely independent flexible pivotal connections 228 As shown, the flexible pivotal connections 228 each include a bracket 228a rigidly secured to either the material carrying member 212 or the base portion 230 along with a short link 228b flexibly pivotally connected to both the bracket 228a and the respective one of the links 224 or 226.

Once again, the embodiment illustrated in FIG. 7 is well suited for applications where there is little vertical space below the first and second vibrators 216 and 220.

While in the foregoing there has been set forth a detailed description of the preferred embodiments, it will be appreciated that the details herein given may be varied by those skilled in the art, while still falling within the true spirit and scope of the appended claims.

I claim:

1. A vibratory conveying apparatus including a material carrying member having a material supporting surface, comprising:

means for supporting said material carrying member for vibratory movement, and means for vibrating said material carrying member, said vibrating means imparting movement to a material on said material supporting surface;

said vibrating means including a first vibrator for producing a first vibratory force for imparting movement to said material carrying member at a first acute angle to said material supporting surface;

said vibrating means also including a second vibrator for producing a second vibratory force for imparting movement to said material carrying member at a second acute angle to said material supporting surface;

said vibratory force of said first vibrator having a vertical force component and a horizontal force component for imparting movement to said material in a first direction relative to said material supporting surface;

said vibratory force of said second vibrator having a vertical force component and a horizontal force component for imparting movement to said material in a second direction relative to said material supporting surface;

means for actuating said first and second vibrators in such manner as to impart controlled movement to said material relative to said material supporting surface in said first direction, said second direction or vertically; and link means for joining said first and second vibrators in a manner eliminating random vibrations therefrom including a link extending from each of said first and second vibrators to a pivotal connection remote therefrom.

2. The vibratory conveying apparatus of claim 1 including means for stabilizing said first and second vibrators to eliminate random vibrations therefrom.

3. The vibratory conveying apparatus of claim 1 including means for varying the magnitude of said vibratory forces produced by said first and second vibrators.

4. The vibratory conveying apparatus of claim 1 wherein said material supporting surface is a generally elongated surface with a longitudinally extending axis.

5. The vibratory conveying apparatus of claim 4 wherein said first direction for imparting movement is axially directly opposite said second direction for imparting movement.

6. A vibratory conveying apparatus including a material carrying member having an elongated material supporting surface with a longitudinally extending axis, comprising:

means for supporting said material carrying member for vibratory movement, and means for vibrating said material carrying member, said vibrating means imparting movement to a material on said material supporting surface;

said vibrating means including a first vibrator for producing a first vibratory force for imparting movement to said material carrying member at a first acute angle to said material supporting surface;

said vibrating means also including a second vibrator for producing a second vibratory force for imparting movement to said material carrying member at a second acute angle to said material supporting surface;

link means for joining said first and second vibrators in a manner eliminating random vibrations therefrom including a link extending from each of said first and second vibrators to a pivotal connection remote therefrom;

said vibratory force of said first vibrator having a vertical force component and a horizontal force component for imparting movement to said material in a first direction relative to said material supporting surface;

said vibratory force of said second vibrator having a vertical force component and a horizontal force component for imparting movement to said material in a second direction relative to said material supporting surface;

said first direction for imparting movement being axially directly opposite said second direction for imparting movement; and means for selectively actuating said first vibrator to impart movement to said material in said first direction, or said second vibrator to impart movement to said material in said second direction, or said first and second vibrators simultaneously.

7. The vibratory conveying apparatus of claim 6 including means for varying the magnitude of said vibratory forces produced by said first and second vibrators.

8. The vibratory conveying apparatus of claim 6 wherein one of said links is rigidly secured to said first vibrator and the other of said links is rigidly secured to said second vibrator.

9. The vibratory conveying apparatus of claim 6 wherein said first vibrator, pivotal connection and second vibrator are at the apices of a triangle.

10. The vibratory conveying apparatus of claim 9 wherein said first and second vibrators are located in a horizontal plane and said pivotal connection is located below said horizontal plane.

11. The vibratory conveying apparatus of claim 9 wherein said first and second vibrators are located in a horizontal plane and said pivotal connection is located above said horizontal plane.

12. The vibratory conveying apparatus of claim 6 wherein said links extend from said first and second vibrators generally in the direction of said first and second vibratory forces, respectively.

13. The vibratory conveying apparatus of claim 6 wherein said links extend from said first and second vibrators generally transverse to said first and second vibratory forces, respectively.

14. A vibratory conveying apparatus including a material carrying member having an elongated material supporting surface with a longitudinally extending axis, comprising:

means for supporting said material carrying member for vibratory movement, and means for vibrating said material carrying member, said vibrating means imparting movement to a material on said material supporting surface;

said vibrating means including a first vibrator for producing a first vibratory force for imparting movement to said material carrying member at a first acute angle to said material supporting surface;

said vibrating means also including a second vibrator for producing a second vibratory force for imparting movement to said material carrying member at a second acute angle to said material supporting surface;

link means for joining said first and second vibrators in a manner eliminating random vibrations therefrom, said link means including a link rigidly secured to and extending from each of said first and second vibrators, said links each extending to a pivotal connection at a point remote from said first and second vibrators;

said vibratory force of said first vibrator having a vertical force component and a horizontal force component for imparting movement to said material in a first direction relative to said material supporting surface;

said vibratory force of said second vibrator having a vertical force component and a horizontal force component for imparting movement to said material in a second direction relative to said material supporting surface;

said first direction for imparting movement being axially directly opposite said second direction for imparting movement;

means for selectively actuating said first and second vibrators in such manner as to selectively impart said first and second vibratory forces to said material supporting surface of said material carrying member; and means for varying the magnitude of said vibratory forces produced by said first and second vibrators to vary the angle of attack and direction of said material relative to said longitudinally extending axis of said material supporting surface;

whereby said material may undergo controlled movement in said first direction, said second direction, or vertically.

15. The vibratory conveying apparatus of claim 14 wherein said first vibrator, pivotal connection and second vibrator are at the apices of a triangle.

16. The vibratory conveying apparatus of claim 15 wherein said first and second vibrators are located in a horizontal plane and said pivotal connection is located below said horizontal plane.

17. The vibratory conveying apparatus of claim 15 wherein said first and second vibrators are located in a horizontal plane and said pivotal connection is located above said horizontal plane.

18. The vibratory conveying apparatus of claim 14 wherein said links extend from said first and second vibrators generally in the direction of said first and second vibratory forces, respectively.

19. The vibratory conveying apparatus of claim 14 wherein said links extend from said first and second vibrators generally transverse to said first and second vibratory forces, respectively.

20. The vibratory conveying apparatus of claim 14 wherein said acute angles for movement imparted by said vibratory forces are approximately forty-five degrees in axially opposite directions.

21. The vibratory conveying apparatus of claim 14 wherein said material supporting surface comprises a fluidized bed for heating, cooling and/or drying a material.

22. The vibratory conveying apparatus of claim 14 including a variable depth gate at one end of said material carrying member for controlling the rate of flow of said material therefrom.

* * * * *